United States Patent [19]

Lehmann et al.

[11] Patent Number: 5,351,018
[45] Date of Patent: Sep. 27, 1994

[54] ANTENNA ISOLATION ASSEMBLY FOR HOT CHASSIS RECEIVER

[75] Inventors: William L. Lehmann; William H. Bose, both of Indianapolis, Ind.

[73] Assignee: Thomson Consumer Electronics, Inc., Indianapolis, Ind.

[21] Appl. No.: 982,286

[22] Filed: Nov. 25, 1992

[51] Int. Cl.$^5$ .................... H01P 3/06; H04B 1/10
[52] U.S. Cl. .................. 333/12; 174/55 G; 333/243; 455/282; 455/338
[58] Field of Search ............... 333/12, 206, 243, 244; 307/91; 361/417, 419, 807, 809; 455/282, 283, 288, 338; 174/55 G, 36, 255

[56] References Cited

U.S. PATENT DOCUMENTS

| | | | |
|---|---|---|---|
| 2,865,006 | 12/1958 | Sabaroff | 333/33 |
| 3,913,038 | 10/1975 | Carter et al. | 333/167 |
| 4,053,835 | 10/1977 | Breitenbach | 333/243 X |
| 4,173,742 | 11/1979 | Lehmann | 333/100 |
| 4,267,529 | 5/1981 | Brun et al. | 333/12 |
| 4,584,544 | 4/1986 | Hettiger | 333/174 |
| 4,790,030 | 12/1988 | Carlson et al. | 455/193 |

*Primary Examiner*—Paul Gensler
*Attorney, Agent, or Firm*—Joseph S. Tripoli; Peter M. Emanuel; Frederick A. Wein

[57] ABSTRACT

A television receiver powered by an alternating current power source includes an electrically conductive chassis coupled to one side of the AC source, a radio frequency tuner coupled to the chassis, and a coaxial cable having an inner conductor and an outer shielding conductor for supplying filtered radio frequency signals to the tuner. The outer conductor is comprised of an electrically conductive housing circumposing the inner conductor for at least a portion of its longitudinal length, and providing electrical connection and mechanical support for the cable assembly. Filtering of the signal is provided by one or more ferrite beads disposed about the outer conductor, and capristor/capacitor devices.

6 Claims, 2 Drawing Sheets

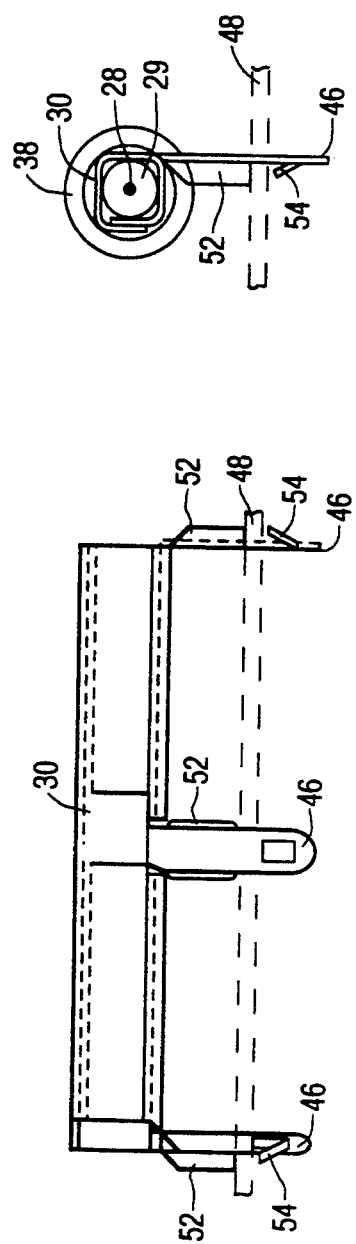

ANTENNA ISOLATION ASSEMBLY FOR HOT CHASSIS RECEIVER

BACKGROUND OF THE INVENTION

This invention relates to radio frequency systems and more particularly to a radio frequency antenna input and filter assembly for a tuner wherein the chassis is coupled to an alternating current source for supplying operating power to the receiver without the benefit of a transformer (hot chassis). The assembly provides isolation sufficient to guarantee safety from electrical shock for an operator of the receiver contacting metallic terminals and/or adjustment knobs on the receiver and also reduces the amount of undesirable signal coupled to the tuner from external electromagnetic radiation.

One of the terminals which are typically accessible to the operator of the receiver is the antenna terminals. Various antenna cable and cable coupling devices are used to transmit desirable signals from an antenna to the tuner. Among these types is a shielded coaxial cable having a characteristic impedance of 75 ohms. The 75 ohm coaxial cable has two concentric conductors (i.e., an inner conductor and an outer or shield conductor). When the 75 ohm coaxial cable is employed, the outer conductor of the coaxial cable is connected to the hot chassis of the receiver to provide an effective shielding from external undesirable electromagnetic fields and a relatively high impedance as compared to the source impedance of the alternating current source to prevent electrical shock to a person contacting the cable or antenna terminals.

Prior art apparatus of a coaxial cable coupled to the antenna terminals of a hot chassis television receiver wherein feedthru capacitors are used, are U.S. Pat. No. 3,913,038 of Carter et al. and U.S. Pat. No. 4,267,529 of Brunet al. The Carter et al. arrangement utilizes such a feed-thru capacitor with a shielded coaxial cable having a braided outer conductor, and ferrite beads circumposed about the braid for producing an input filter in combination with capristor devices. An antenna isolation assembly must isolate the "hot-chassis" from the antenna connector, and provide rejection of co-channel interference by eliminating as much as possible, any ingress to the tuner of signal, of extraneous signals. However, this arrangement requires a costly high voltage rated feed-thru capacitor arrangement to shunt unwanted signals from the coaxial antenna input terminal to ground, and presents production difficulties, because when the cable length is small, there is not sufficient friction between the braid and the center insulation to provide a stable mechanical arrangement. This is particularly awkward since the braid, with a ferrite bead mounted thereon, can slide with respect to the center insulation during assembly. This lack of mechanical stability increases the costs and difficulties of production. Accordingly, it is desirable to provide a shield for an input cable which can accept a ferrite bead while maintaining a stable mechanical arrangement.

SUMMARY OF THE INVENTION

According to aspects of the present invention, a television receiver powered by an alternating current power source includes an electrically conductive chassis coupled to one side of the AC source, a radio frequency tuner coupled to the chassis, and a coaxial cable having an inner conductor and an outer shielding conductor for supplying filtered radio frequency signals to the tuner. The outer conductor is comprised of an electrically conductive housing circumposing the inner conductor for at least a portion of its longitudinal length, and providing electrical connection and mechanical support for the cable assembly. Filtering of the signal is provided by one or more ferrite beads disposed about the outer conductor, and capristor/capacitor devices.

BRIEF DESCRIPTION OF THE DRAWINGS

FIGS. 2A and 2B are a plan and side views respectively of the coaxial shield of the antenna isolation assembly of FIG. 1, according to aspects of the present invention.

DETAILED DESCRIPTION OF THE PREFERRED EMBODIMENT

Figure 1:
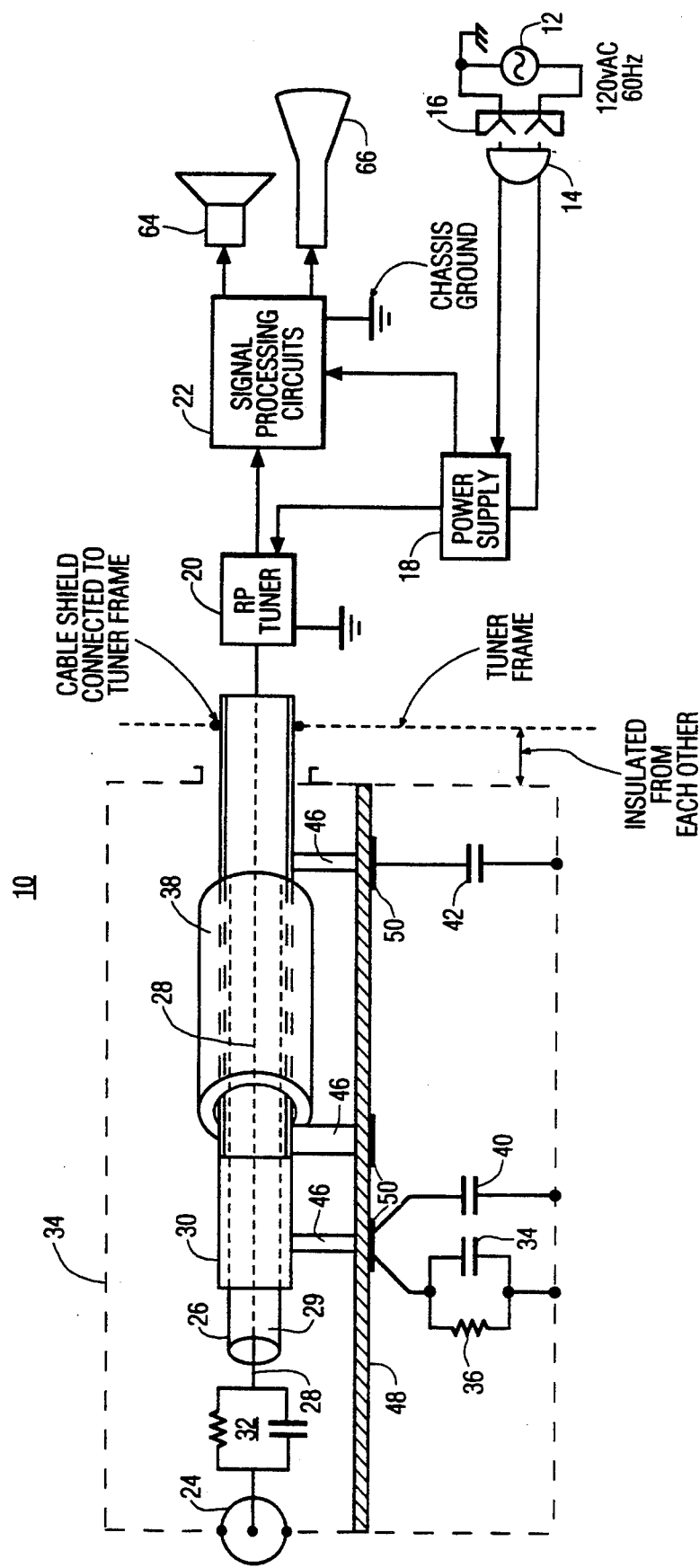
FIG. 1 is a partial schematic diagram, partial mechanical representation, and partial block diagram of the antenna isolation assembly and representative television receiver according to aspects of the present invention.

Referring to FIG. 1, power supply 18 of television receiver 10 is adapted to be coupled to a source of alternating current 12 by means of a plug 14 and a receptacle 16. Power supply 18 in turn supplies power to the radio frequency tuner 20 and the signal processing circuits 22. However, since no isolation transformer is used, such an arrangement presents the possibility of electrical shock to the operator of the television receiver 10 when the operator contacts the chassis or externally accessible electrically conductive components even when a polarized AC plug is used, since there is no guarantee that the AC electrical socket will always be correctly wired. Thus, precautions must be made to assure proper shock isolation for the antenna terminals in a "hot chassis" receiver.

Radio frequency tuner 20 converts radio frequency signals into intermediate frequency signals by mixing a signal generated by a local oscillator (not shown) with the received radio frequency signals to develop intermediate frequency (I.F.) signals for each selected radio frequency channel. The IF output of tuner 20 is coupled to signal processing circuits 22 to retrieve the audio modulation and video modulation contained in the radio frequency signals. A loudspeaker 64 is coupled to the signal processing circuits 22 and provides the sound. A cathode ray tube 66 is coupled to the signal processing circuits 22 and provides a video display.

Tuner 20 is also coupled to a source 24 of radio frequency signals through a coaxial cable 26. Coaxial cable 26 has an inner conductor 28, an insulator 29 disposed about conductor 28, and an outer shielding conductor 30 concentric with the inner conductor 28. Signals from source 24 are coupled through a capristor 32 to inner conductor 28 within a shield 34. Capristors, as discussed herein, are UL/CSA approved devices made by the Murata Corporation of Japan as part number B2R131C471R2.5-4M-141MG, which comprise a 470 picofarad (pf) capacitor in parallel with a large valued resistor in the megohm range. The capristor capacitance is small enough to pass only a small non-hazardous amount of AC power supply "shock" current yet large enough to pass the 50–800 MHz television signals with little attenuation.

A capristor 36 is coupled between outer shielding conductor 30 and shield 34. The finite resistance (1 to 4 megohms) at DC provides for the discharge of any accumulated charge on the capristor capacitors resulting from leakage currents in the system. A ferrite bead 38 is disposed about coaxial cable 26. Outer conductor 30 is also coupled to shield 34 by capacitor 40 of 680 pf at the signal input side of ferrite bead 38, and by capacitor 42 of 100 pf at the signal output side of ferrite bead 38. The signal output end of inner conductor 28 is coupled to an input terminal of radio frequency tuner 20.

The capacitance values, and the lead inductances of the capristor capacitors and associated conductors, form series resonant traps at selected frequencies for optimizing attenuation of extraneous signals at certain frequencies. The 680 pf value of capacitor 40 is chosen to provide maximum shunting of extraneous signals from outer conductor 30 to ground in the "low VHF" range at about channel 2, the 470 pf value of capacitor 37 is chosen to provide maximum shunting at channel 6, and the 100 pf value of capacitor 42 is chosen to provide maximum shunting about the middle of the "high VHF" band at about channel 10.

Further filtering is provided by using one or more ferrite beads disposed about the periphery of the cable itself. By assembly of the bead around the cable, an equivalent circuit of a resistance in series with an inductance is presented to any signals flowing in the shield. A single bead can add 6 DB or more of attenuation to unwanted VHF signals in the cable shield.

The mechanical instability of the outer shield assembly as discussed above is solved by making an "artificial" coaxial cable with ordinary "hookup wire" for providing the insulation 29 for the center conductor 28, and a formed wrap-around metal shield for the outer shielding conductor 30. In the exemplary embodiment, outer conductor 30 is formed from stamped brass sheet metal which is snap fitted in a close friction fit with insulation 29 so that there is little or no mechanical slippage between outer conductor 30 and insulation 29. This arrangement still maintains the characteristic impedance (75 ohms) of the coaxial cable and permits ferrite bead 38 to fit around it. It should be noted that the described cable arrangement can also provide coaxial cables of different impedances depending upon the dimensioning and insulation materials used.

Outer conductor 30 has unitarily formed legs 46 for mounting the assembly to printed circuit board 48 with legs 46 being soldered to printed circuit conductors 50, which in turn are coupled to chassis ground via components 36, 40, and 42. Printed circuit board 48 is mechanically secured (not shown) within shield 34. Capristors 32, 36, and capacitors 40, 42 are also mounted (not shown) on printed circuit board 48 with members 36, 40 and 42 having their electrical wiring to shield 34 symbolically shown in FIG. 1. Shield 34 is made of an appropriate electromagnetic shielding material and encloses the components discussed herein within the volume.

Outer conductor 30 is shown in greater detail in the plan view of FIG. 2A and in cross-section in FIG. 2B. FIG. 2A shows details of the legs 46 having support protrusions 52 and retainer tabs 54 for respectively mounting and locking to printed circuit board 48, which is shown in phantom. FIG. 2B shows outer conductor 30 installed around the insulation 29 and forming a close "snug" fit with insulation 29. Outer conductor 30 is also shown with a ferrite bead 38 assembled thereon.

What is claimed is:

1. An RF receiver including a radio frequency tuner coupled to a radio frequency signal source by a coaxial cable having inner and outer conductors, said coaxial cable comprising:
   an inner conductor having longitudinal length,
   an electrical insulation means having longitudinal length and circumposed about the inner conductor over a portion of its longitudinal length, and
   an outer conductor having longitudinal length and circumposed about the electrical insulation means over a portion of its longitudinal length for shielding the inner conductor, said outer conductor being made from electrically conductive sheet metal and a portion of the outer conductor enclosing a portion of the outer perimeter of the electrical insulation means in a close fitting friction fit, said outer conductor having unitary legs for mounting to a support means and electrically coupling the outer conductor to a reference potential.

2. The coaxial cable of claim 1 wherein said cable has a characteristic impedance of 75 ohms.

3. The coaxial cable of claim 1 further comprising a ferrite bead circumposed about a portion of the longitudinal length.

4. A coaxial cable comprising:
   an inner conductor having longitudinal length,
   an electrical insulation means having longitudinal length and circumposed about the inner conductor over a portion of its longitudinal length, and
   an outer conductor having longitudinal length and circumposed about the electrical insulation means over a portion of its longitudinal length for shielding the inner conductor, said outer conductor being made from electrically conductive sheet metal and a portion of the outer conductor enclosing the outer perimeter of the electrical insulation means in a close fitting friction fit, said outer conductor having unitary legs for mounting to a support means and electrically coupling the outer conductor to a reference potential.

5. The coaxial cable of claim 4 wherein said cable has a characteristic impedance of 75 ohms.

6. The coaxial cable of claim 4 further comprising a ferrite bead circumposed about a portion of the longitudinal length.

* * * * *